United States Patent [19]

Harada et al.

[11] Patent Number: 5,083,543
[45] Date of Patent: Jan. 28, 1992

[54] ENGINE CONTROL SYSTEM

[75] Inventors: Yasuhiro Harada; Akira Kamisakamoto; Shoji Imai, all of Hiroshima, Japan

[73] Assignee: Mazda Motor Corporation, Hiroshima, Japan

[21] Appl. No.: 648,976

[22] Filed: Jan. 31, 1991

[30] Foreign Application Priority Data

Feb. 5, 1990 [JP] Japan .................................. 2-26450

[51] Int. Cl.⁵ .................. F02D 41/10; F02B 37/12
[52] U.S. Cl. ............................. 123/492; 123/52 M; 60/612
[58] Field of Search ............. 123/562, 52 M, 478, 123/480, 492; 60/600, 601, 603, 612

[56] References Cited

U.S. PATENT DOCUMENTS

| | | | |
|---|---|---|---|
| 4,711,200 | 12/1987 | Kinoshita | 123/492 |
| 4,726,337 | 2/1988 | Yoshida | 123/52 M |
| 4,873,961 | 10/1989 | Tanaka | 123/492 |
| 4,982,567 | 1/1991 | Hashimoto et al. | 60/612 X |
| 5,005,359 | 4/1991 | Tashima et al. | 60/612 X |
| 5,009,200 | 4/1991 | van Basshuysen et al. | 123/52 M |

FOREIGN PATENT DOCUMENTS

| | | | |
|---|---|---|---|
| 59-15656 | 1/1984 | Japan . | |
| 0219416 | 11/1985 | Japan | 60/612 |
| 0042123 | 2/1990 | Japan | 123/562 |
| 0136515 | 5/1990 | Japan | 123/562 |

OTHER PUBLICATIONS

Abstract-Secondary Air Supplying Apparatus of Engine with Turbocharger, 59-160022; 9/10/84; Fujimoto.
Abstract-Exhaust Turbocharger; 56-41417; 4/18/81; Vehara.

*Primary Examiner*—Willis R. Wolfe
*Attorney, Agent, or Firm*—Sixbey, Friedman, Leedom & Ferguson

[57] ABSTRACT

Fuel injection increasing timing occurs differently from the timing of changing an intake air flow and an exhaust gas flow, wherein the fuel injection quantity is controlled by a detected intake pressure and an engine which increases the fuel injection quantity at accelerating comprises a system for changing an exhaust gas glow of an exhaust system by a sequential turbo control and changing an intake air flow of an intake system by a dynamic effect of an intake air. The fuel supply is delayed by the fuel injection quantity increase at accelerating. This delay and pressure difference of intake air and exhaust gas by changing intake air flow and exhaust gas flow work together to prevent the air fuel ratio from fluctuating greatly, and a good engine combustion is maintained.

8 Claims, 9 Drawing Sheets

ENGINE CONTROL SYSTEM

BACKGROUND OF THE INVENTION

The present invention relates to an engine control system for increasing a fuel injection quantity at accelerating and changing, for example, an exhaust gas flow according to a driving status wherein an engine controls a fuel injection depending on an intake pressure.

In such an engine that the fuel injection quantity is controlled by an electronic device, an air flow meter and a hot wire air flow sensor are provided in an intake passage for detecting an intake air flow and determines the fuel injection quantity according to signals from the meter and the sensor. However, the air flow meter is large and therefore, it has a laying out disadvantage. Also, an intake resistance becomes large by the air flow meter and correspondence to the change of the intake air flow may be delayed easily.

As disclosed in the Japanese Patent Application Laing Open Gazette No. 59-15656, it is known that the fuel injection quantity is determined by a data map, etc. on the basis of an intake pressure detected by an intake pressure sensor (MAP sensor) for detecting a pressure inside an intake manifold on a downstream of a throttle valve.

Some engines include changing means for changing exhaust gas flow of an exhaust system depending on the driving status. For example, by diving one turbosupercharger at a low intake air flow and driving two turbo-superchargers at a high intake air flow, the efficiency of supercharging can be improved. In other words, the exhaust system is divided into two systems and a turbine of one of superchargers is provided on each system. The changing means change the exhaust gas flow by supplying the exhaust gas to both turbines or supplying the exhaust gas to only one turbine, which means the exhaust gas is shut out to flow to the another turbine.

In such an engines including changing means, a fuel injection control can be carried out on the basis of signals from the above intake pressure sensor. Also, in the fuel injection control, correctively increasing the fuel injection quantity for improving the efficiency at acceleration has been tried.

In some cases, both increasing fuel injection quantity means for correctively increasing the fuel injection quantity on the basis of the signal from the intake pressure sensor and the changing means for controlling the exhaust gas flow are provided together. However, the engine combustion may become worse by a fluctuation of an air fuel ratio when the exhaust gas flow is controlled under the fuel injection quantity is increased at acceleration.

In detail, the air fuel ratio is easy to fluctuate by the delay of fuel supplying during acceleration when the fuel injection quantity is increased. On the other hand, when exhaust gas flow is changed, an exhaust pressure (an exhaust gas pressure) is changed according to the change of the exhaust gas flow and the intake air charging of the engine is changed even the same intake pressure is maintained. Then, the fluctuation of the air fuel ratio occurs easier. Accordingly, when the exhaust gas pressure is changed by changing the exhaust gas flow under acceleration wherein the air fuel ratio fluctuates, the air fuel ratio may fluctuate more.

Also, a system of supercharging intake air to an engine by utilizing a dynamic effect of intake air encounters the same problem when the intake pressure is changed. For example, a volume part is provided on the intake system to gain a dynamic effect. In a specified engine speed region (tuning speed region), an intake negative pressure wave generated on an intake port according with the opening of an intake valve at an initial stage of intake air process of each cylinder is transmitted to an upstream side of an intake passage on a sonic speed, and the negative pressure wave is converted to a positive pressure wave at the above volume part. Thereafter, the positive pressure wave is transmitted to the downstream side of the intake pressure on a sonic speed through the same passage so as to reach at the same intake port at the last stage of the intake air process which is right before the intake valve is closed, and an intake air is compressed to a combustion chamber by the positive pressure wave in order to improve the charging efficiency.

At this time, in a wide range of engine speed, in order to gain the efficiency of supercharging by the above dynamic effect, the length of the intake passage is changed in several ways and by this change, the intake air flow is changed. When the intake air flow is changed, the intake pressure is changed according with it and the intake air charging to the engine is changed. Consequently, the air fuel ratio is easy to fluctuate. Thus, at acceleration of the engine, the air fuel ratio fluctuates greatly by the change of the intake pressure from changing of the intake air flow.

The objects of the present invention is to provide such an engine control system prevents that the fluctuation of air fuel ratio caused by delaying of fuel supply at acceleration of the engine and by the pressure change by the exhaust gas and intake air flow and improves the engine combustion at the acceleration.

SUMMARY OF THE INVENTION

Figure 1:
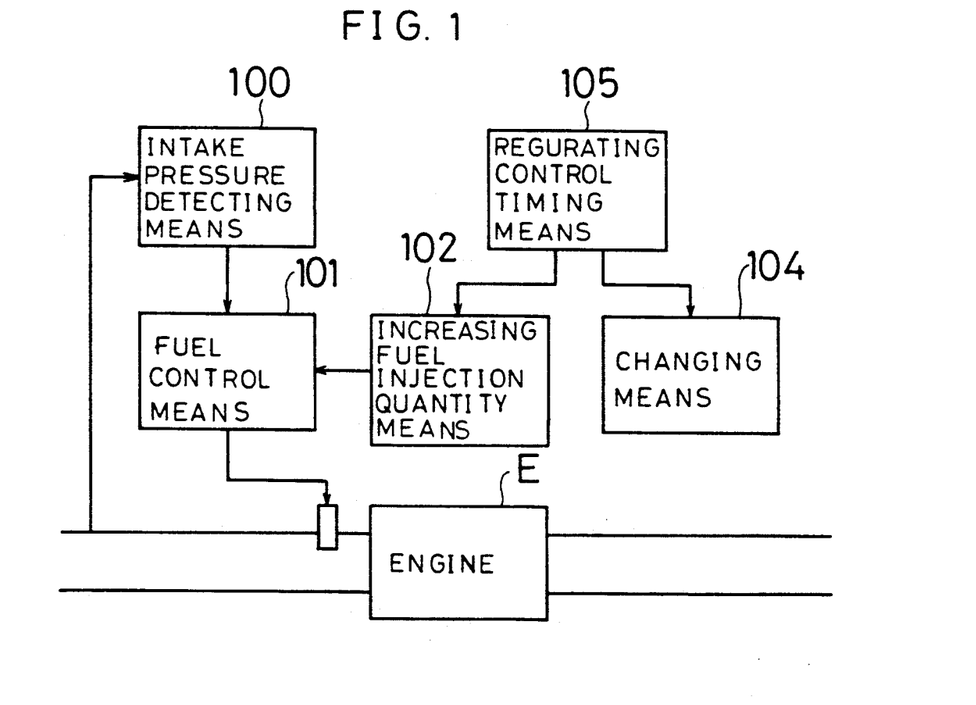
FIG. 1 is a block diagram showing a basic arrangement of the present invention.

In order to achieve the above objects, the control system of the present invention, as shown in FIG. 1, wherein an engine E includes intake pressure detecting means 100 for detecting the intake pressure and fuel control system 101 for controlling the fuel injection depending on the intake pressure detected by the intake pressure detecting means 100, comprises increasing fuel injection quantity means 102 for correctively increasing a fuel injection quantity, which is controlled by a fuel control means 101, at the acceleration of the engine E, changing means 104 for changing the intake pressure depending on a driving states of the engine E, and regulating control timing means 105. The regulating control timing means 105 regulate the timing of the control of increasing the fuel injection quantity by the increasing fuel injection quantity means 102 and the timing of control of changing the intake pressure by the changing means 104 so as to make them occur at a different timing.

The above changing means 104 changes an exhaust gas flow of an exhaust system according to a driving status of the engine E or changes an intake air flow of an intake system according to a driving status of the engine E.

In the former case, which the changing means 104 change the exhaust gas flow of the exhaust system, the regulating control timing means 105 delay the timing of changing the exhaust gas flow of the exhaust system changed by the changing means 104 for a specified period of time from the acceleration starting point of the engine E.

The exhaust system is divided into two systems, and each turbine of the first and the second turbosupercharger is provided at each divided exhaust system. The changing means 104 changes the exhaust gas flow between two alternatives: to supply an exhaust gas to a turbine in the first supercharger and shut out the supply of an exhaust gas to a turbine in the second supercharger, or to supply an exhaust gas to both turbines of the first and the second supercharges.

When the exhaust gas flow is changed by the two superchargers, the regulating control timing means 105 delays the timing of changing the exhaust gas being supplied only to one turbine of the first supercharger to being supplied to the two turbines of the first and the second supercharger for a specified period of time from the acceleration starting point of the engine E.

In the latter case, which the changing means 104 change the intake air flow of the intake system, a volume part such as a surge tank is formed on the intake passage of the engine E and the intake passage on the downstream side of the volume part is divided into a plurality of passages of various length arranged in parallel. The changing means 104 comprises at least one selector valve for opening/closing the above passages according to driving status of the engine E. By this opening/closing passages by the selector valve, the length of the passage from a cylinder of the engine E to the volume part is changed.

When the intake air flow is changed by the selector valve of the changing means 104, the regulating control timing means 105 delays the timing of opening/closing passages by the selector valve for a specified period of time from the acceleration starting point of the engine E.

DESCRIPTION OF THE PREFERRED EMBODIMENT

The preferred embodiment is described below with reference to the accompanying drawings.

Figure 2:
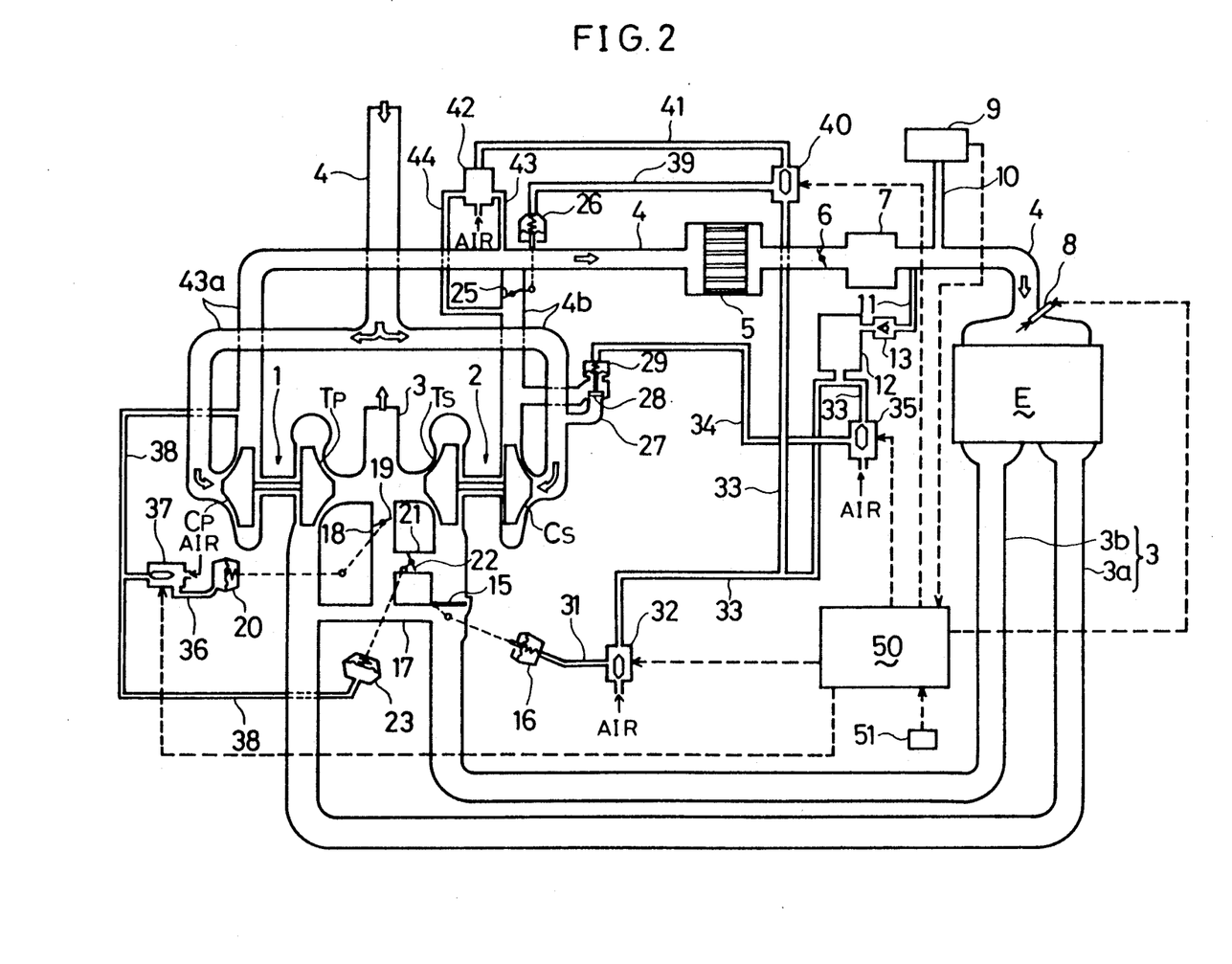
FIG. 2 is a schematic illustration showing an engine, an intake system, and an exhaust system of the present invention.

FIG. 2 shows an engine and intake and exhaust systems of it according to the present invention. In this embodiment, changing means for changing an exhaust gas flow according to a driving status of the engine E is so called a sequential turbo system comprising a first turbosupercharger 1 driven in all driving status region and a second turbosupercharger 2 operated only in high intake air flow area.

As shown in FIG. 2, each turbosupercharger 1, 2 comprises turbines Tp, Ts driven by the exhaust gas and compressors Cp, Cs connected to the turbines Tp, Ts and supercharge the intake air by their rotation.

An exhaust passage 3 of the engine E is divided into a first and a second exhaust passages 3a, 3b respectively. The above turbines Tp, Ts are provided on the first and the second exhaust passages 3a, 3b respectively, and both exhaust passages 3a, 3b join at the downstream side of the turbines Tp, Ts. By an exhaust cutoff valve 15, etc., the exhaust gas flow is changed.

On the other hand, an intake passage 4 for supplying intake air to the engine E is divided into a first and a second intake passages 4a, 4b on the downstream side of an air clear (not shown in the drawing). The compressors Cp, Cs are provided on the first and the second intake passages 4a, 4b, and the intake passages 4a, 4b join on the downstream side of the compressors Cp, Cs. On the downstream side of this joining point of the intake passage 4, an intercooler 5, a throttle valve 6, a surge tank 7, and a fuel injector 8 are provided. An intake pressure sensor 9 (MAP sensor: intake pressure detecting means in the present invention) detecting an intake pressure PM on the downstream side of the throttle valve 6 is connected to the intake passage 4 through the pressure taking passage 10. Moreover, a negative pressure tank 12 storing the intake negative pressure for operating later described various actuators is connected to the intake passage 4 on the downstream side of the throttle valve 6 through a check valve 13.

Provided on the second exhaust passage 3b on the upstream side of turbine Ts of the second turbosupercharger 2 is an exhaust cutoff valve 15 driven by an actuator 16. This exhaust cutoff valve 15 shuts off exhaust gas flow to the turbine Ts in the low intake air flow region. The upstream side of the exhaust cutoff valve 15 on the second exhaust passage 3b is connected to the first exhaust passage 3a on the upstream side of the turbine Tp though a bypass 17. Thus, when the exhaust cutoff valve 15 is closed, the exhaust gas outflew to the second exhaust passage 3b in addition to the exhaust gas outflew to the first exhaust passage 3a is supplied to the turbine Tp of the first turbosupercharger 1. Consequently, only the first turbosupercharger 1 is driven. On the other hand, when the exhaust cutoff valve 15 is opened, the exhaust gas outflew to the exhaust passage 3a, 3b are supplied to the turbines Tp, Ts respectively and superchargers 1, 2 are driven.

The bypass 17 and the exhaust passage 3 on the downstream side of the both turbines Tp, Ts are connected to each other through a bypass 18. A waste gate valve 19 driven by an actuator 20 is provided on the bypass 18. The bypass 18 on the upstream side of the waste gate valve 19 and the entrance side of the turbine Ts of the second turbosupercharger 2 are connected to each other by an exhaust snifting passage 21 which bipasses the exhaust cutoff valve 15. An exhaust snifting valve 22 is opened/closed by an actuator 23 is provided in the exhaust snifting passage 21. The exhaust snifting valve 22 supply a little amount of exhaust gas to the turbine Ts of the second turbosupercharger 2 right before the exhaust cutoff valve 15 is opened so that the second turbosupercharger 2 is pre-rotated. By this pre-rotation of the second turbosupercharger 2, the response to the supercharger is improved when the exhaust cutoff valve is opened.

On the other hand, an intake cutoff valve 25 opened/closed by an actuator 26 is provided on the second intake passage 4b. This intake cutoff valve 25 closes the second intake passage 4b when the second turbosupercharger 2 is not driven and it is not fully driven. This arrangement prevents the intake air from reentering the second intake passage 4b. The upstream side and the downstream side of the compressor Cs communicate each other by an intake relief passage 27 on the second intake passage 4b on the upstream side of the intake cutoff valve 25. A relief valve 28 opened/closed by an actuator 29 is provided on the intake relief passage 27. The relief valve 28 opens the intake relief passage 27 until right before the intake cutoff valve 25 and the exhaust cutoff valve 15 are opened under the engine speed is going up. Thus, during the second turbosupercharger 2 is pre-rotated in accordance with the opening of the exhaust snifting valve 22, the pressure of the second intake passage 4b between the compressor Cs and the intake cutoff valve 25 is prevented from getting higher and the compressor Cs is made easy to rotate.

The above actuators 16, 20, 23, 26, 29 are constructed by a diaphragm system and the control system for these is described below.

The actuator 16 is connected to a three-way electromagnet valve 32 through a control pressure inflow passage 31. The three-way electro-magnet valve 32 selectively connects the control pressure inflow passage 31 to either an air side or a negative pressure passage 33 which goes to the negative pressure tank 12. In short, the exhaust cutoff valve 15 is opened/closed by the switching of the three-way electro-magnet valve 32. The actuator 29 is also connected to a three-way electro-magnet valve 35 through a control pressure inflow passage 34. The three-way electro-magnet valve 35 selectively connects the control pressure inflow passage 34 either to an air side or the negative pressure passage 33, and a relief valve 28 is opened/closed by the switching of the three-way electro-magnet valve 35.

The actuator 20 is communicated to a three-way electro-magnet valve 37 through the control pressure inflow passage 36. The three-way electro-magnet valve 37 selectively connects the control pressure inflow passage 36 either to an air side or a supercharging pressure inflow passage 38. Therefore, when the high supercharger pressure is inflew from a supercharging pressure passage 38 to the actuator 20 through the three-way electro-magnet valve 37, the waste gate valve 19 is opened. The actuator 23 is connected to the supercharging pressure inflow passage 38 and the exhaust snifting valve 22 is opened when the supercharging pressure on the downstream side of the compressor Cp of the first turbosupercharger 1 reaches a determined value (for example, 500 mmHg).

The actuator 26 is connected to a three-way electro-magnet valve 40 through a control pressure inflow passage 39. The three-way electro-magnet valve 40 selectively communicates control pressure inflow passage 39 either a passage 41 connected to a pressure difference detecting valve 42 or to a negative pressure passage 33. The pressure difference detecting valve 42 is operated by the pressure difference between a supercharging pressure P1, which is inflew from the first intake passage 4a through a passage 43, and a supercharging pressure P2, which is inflew from the second intake passage 4b through a passage 44. In short, the pressure difference detecting valve 42 opens the passage 41 to supply air when the above pressure difference is great and closes the passage 41 when the pressure difference is less than a determined difference. Accordingly, the intake cutoff valve 25 is opened/closed by the pressure difference detecting valve 42 and the three-way electro-magnet valve The three-way electro-magnet valves 32, 35, 37, 40 are controlled by a control unit 50. The control unit 50 receives signals from the intake pressure sensor 9, engine speed sensor 51 for detecting an engine speed.

The control unit 50 outputs control signals to three-way electro-magnet valves 32, 35, 37, 40 to open/close the exhaust cutoff valve 15, etc. from the later described control map according to an engine load detected by the intake pressure sensor 9 and the engine speed sensor 51. Through this process, the control of the sequential turbo (control of the exhaust gas flow changing means) is carried out. The control unit 50 controls the fuel injection quantity by outputting the fuel injection signal (injection pulse) to a fuel injector 8. The fuel injection quantity is basically controlled on the basis of the intake pressure PM detected by the intake pressure sensor 9. In short, a base fuel injection quantity is determined by the intake pressure PM and the engine speed R from the fuel map. However, the fuel is correctively increased at accelerating. Fuel control means and increasing fuel injection quantity means are constructed by utilizing a control function of the control unit 50.

Also, the control unit 50 controls the regulating control timing means. As shown in a flow chart, an exhaust gas flow control, i.e., opening/closing the exhaust cutoff valve 15 for changing an exhaust gas flow, is delayed for a determined period of time such that the control of opening/closing the exhaust cutoff valve 15 is started after the fuel injection quantity is increased.

Figure 3:
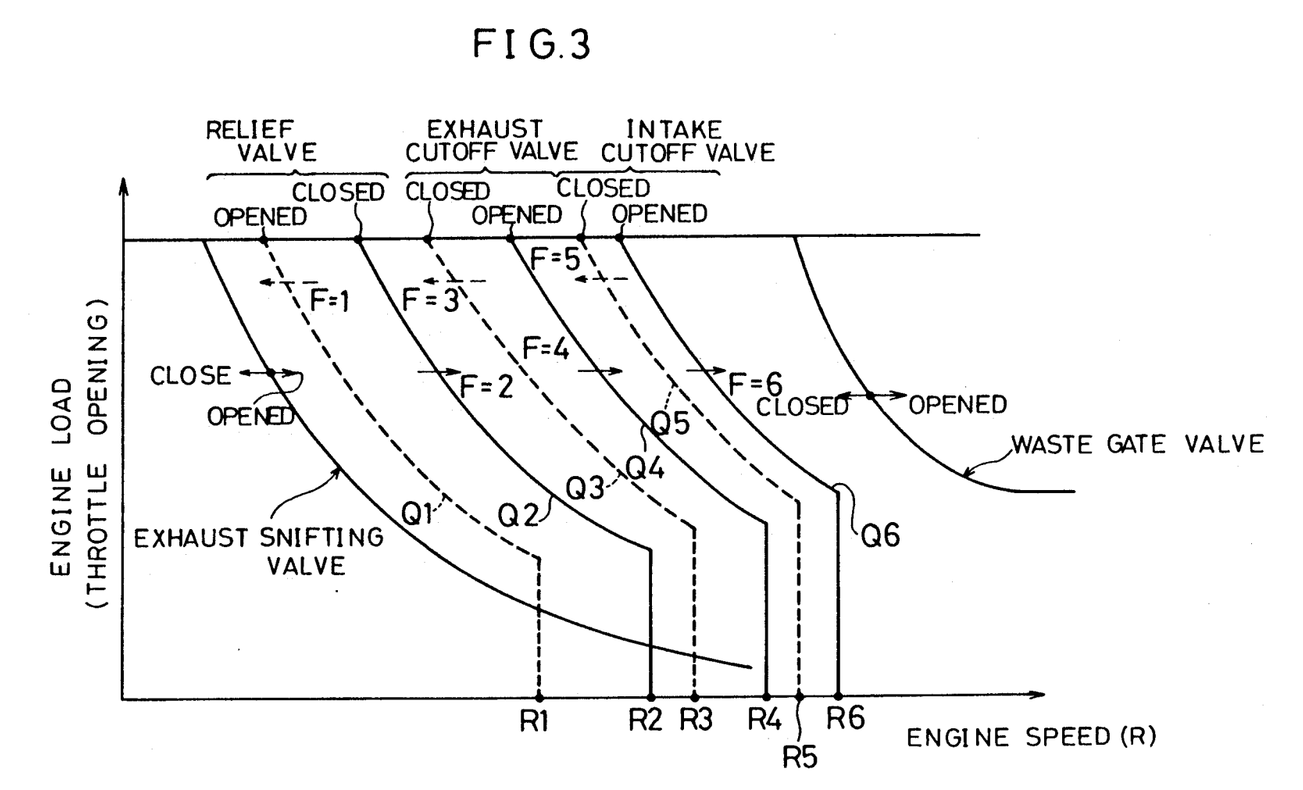
FIG. 3 is a characteristic chart for explaining an operation of each valve provided in an intake system and an exhaust system.

FIG. 3 is a control map illustrating opening/closing of the exhaust cutoff valve 15 and the intake cutoff valve 25 together with opening/closing of the waste gate valve 19, the exhaust snifting valve 22, and the relief valve 28. As shown in FIG. 3, when the engine is in a low speed and a low engine load region, an exhaust cutoff valve 15, an intake cutoff valve 25, the waste gate valve 19, and the exhaust snifting valve 22 are closed and the relief valve 28 is opened. In the process that the engine is changed from being in low engine speed and low engine load region to being in high engine speed and high engine load region, the exhaust snifting valve 22 opens first when the supercharging pressure of the first intake passage 4a reaches a determined value. Therefore, when an intake equivalent value Q obtained from both the intake pressure PM and an engine speed R or an engine speed R crosses over the line Q2-R2 drawn by second set values Q2 and R2, the relief valve 28 is "opened". Later when the intake equivalent valve Q or the engine speed R crosses over the line Q4-R4 drawn by forth set values Q4 and Q4, the exhaust cutoff valve 15 is "opened". Furthermore, when they cross over the line Q6-R6 drawn by sixth set values Q6 and R6, the intake cutoff valve 25 is "opened".

On the other hand, in the process that the engine is changed from in high engine speed and high engine load to in a low engine speed and low engine load region, the intake cutoff valve 25 is "closed" when the intake equivalent value Q and the engine speed R cross under the line Q5-R5 drawned by fifth set values Q5 and R5. When the intake equivalent value Q and the engine speed R cross under the line Q3-R3 drawn by third set values Q3 and R3, the exhaust cutoff valve 15 is "closed". Then, when the intake equivalent value Q and the engine speed R cross under the line Q1-R1 drawned by first set values Q1 and R1, the relief valve 28 is "opened". Thus, the lines Q1-R1, Q3-R3, and Q5-R5 are hysteresial of the lines Q2-R2, Q4-R4, and Q6-R6 respectively. The waste gate valve 19 is opened when the engine speed and the throttle opening are more than a determined value and the supercharging pressure is also more than a determined value.

Each set value Q1~Q6, R1~R6 of the control map is prememorized in the control unit 50. Control is basically carried out according to this control map. However, at the acceleration of the engine, in spite of the driving status, the control is delayed in a certain period of time.

Figure 4:
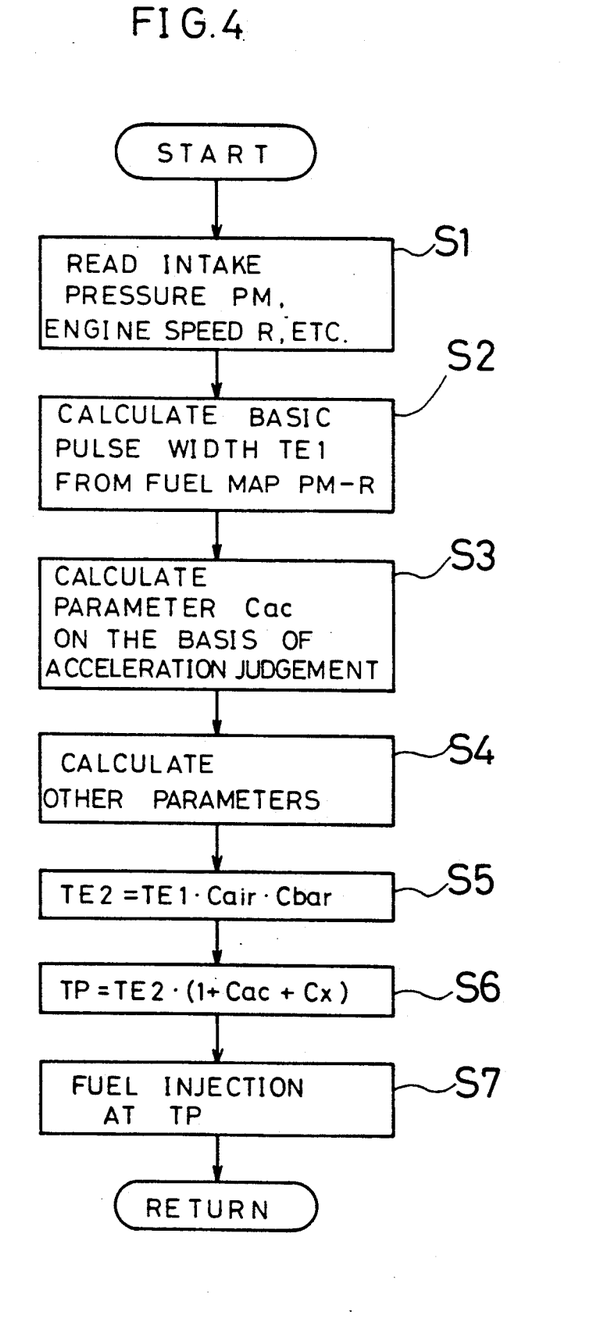
FIG. 4 is a flow chart illustrating one example of a sequence of a fuel control.

FIG. 4 is a flow chart illustrating a fuel control by a control unit 50, and FIG. 5 is a flow chart illustrating a control by a sequential turbo. In the routine of the fuel control in FIG. 4, at step S1, the intake pressure PM and an engine speed R are read. At step S2, a basic pulse width TE1 is calculated on the basis of the intake pressure PM and the engine speed R. At step S3, it is judged whether or not an engine is accelerated by detecting the intake pressure change, and acceleration increasing parameter $C_{ac}$ is calculated by this judgement. A parameter $C_{ac}$ for fuel increasing fuel injection quantity at acceleration is found according to an acceleration, but the parameter $C_{ac}$ for fuel increase is set to be "0" other than at accelerating. At step S4, other parameters are calculated. At following step S5, TE2 which is obtained by multiplying a parameter $C_{air}$ on the basis of the intake air temperature and a parameter $C_{bar}$ on the basis of an air pressure to the basic pulse width TE1. At step S6, a final pulse width TP is calculated from TE2 considering the parameter $C_{ac}$ and other parameters $C_x$. At step S7, a control signal having the final pulse width TP is outputted to the fuel injector 8 and the fuel injection is effective.

Figure 5A:
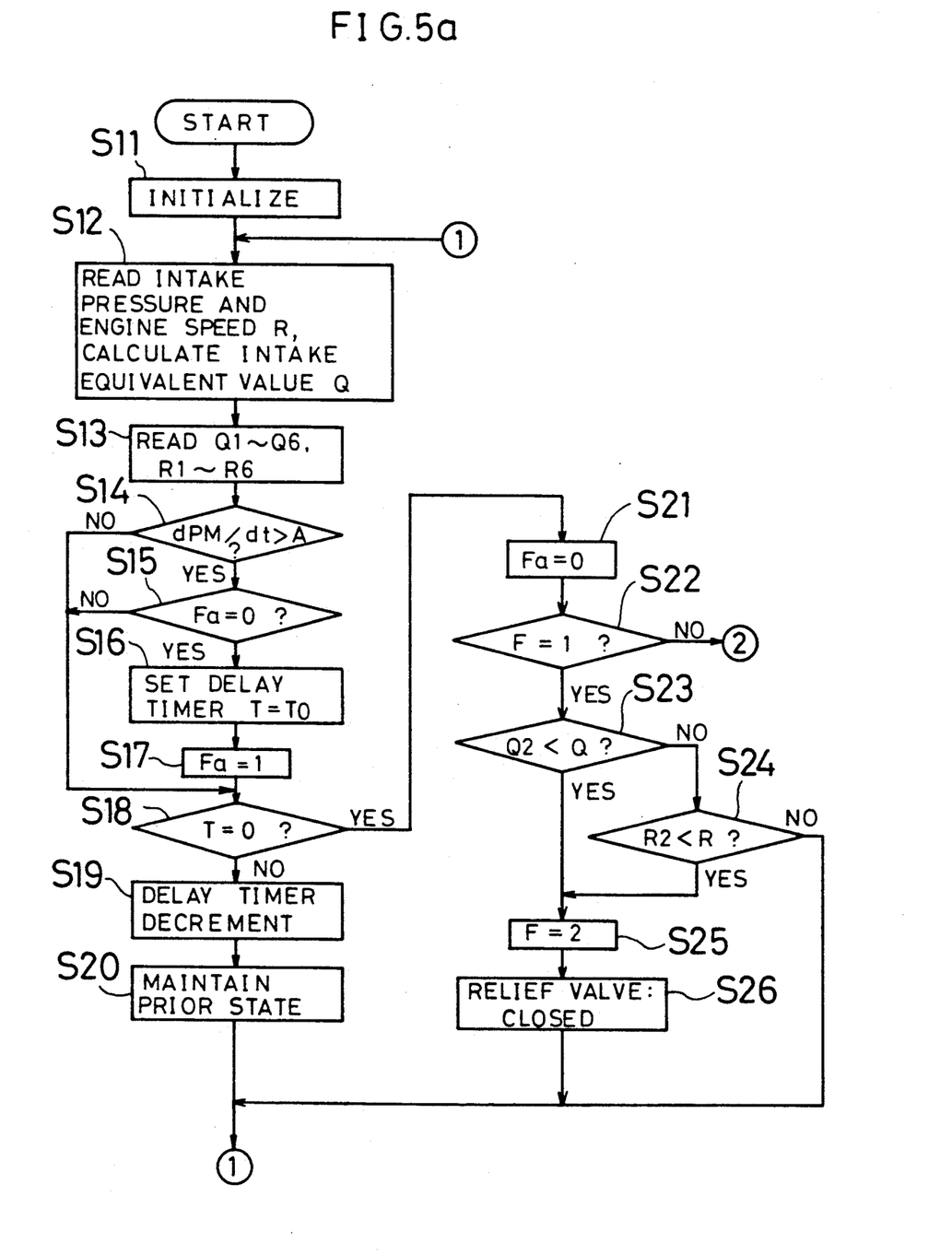
FIGS. 5a-5c are flow charts illustrating one example of a sequence of the sequential turbosupercharge system.
Figure 5B:
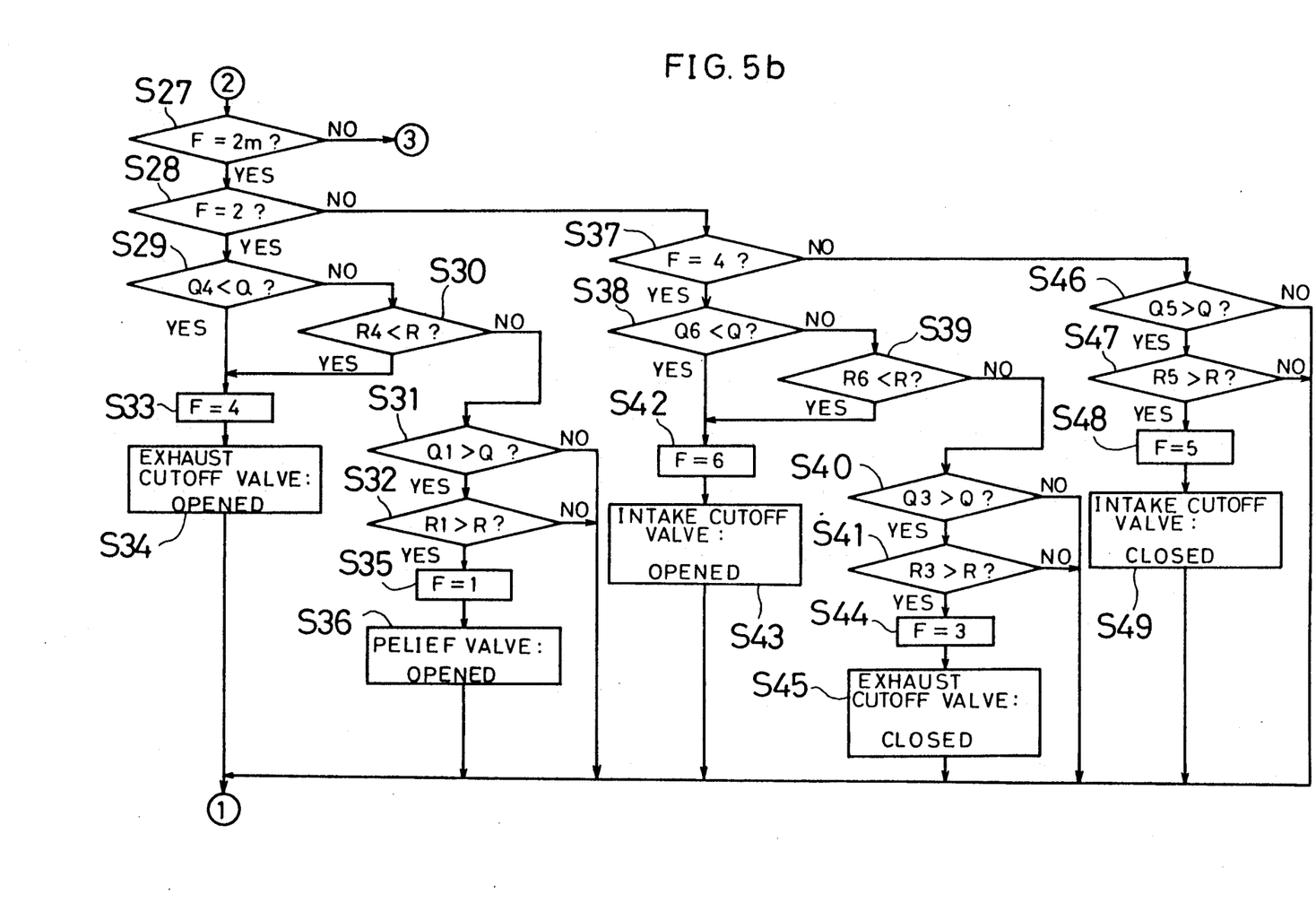
Figure 5C:
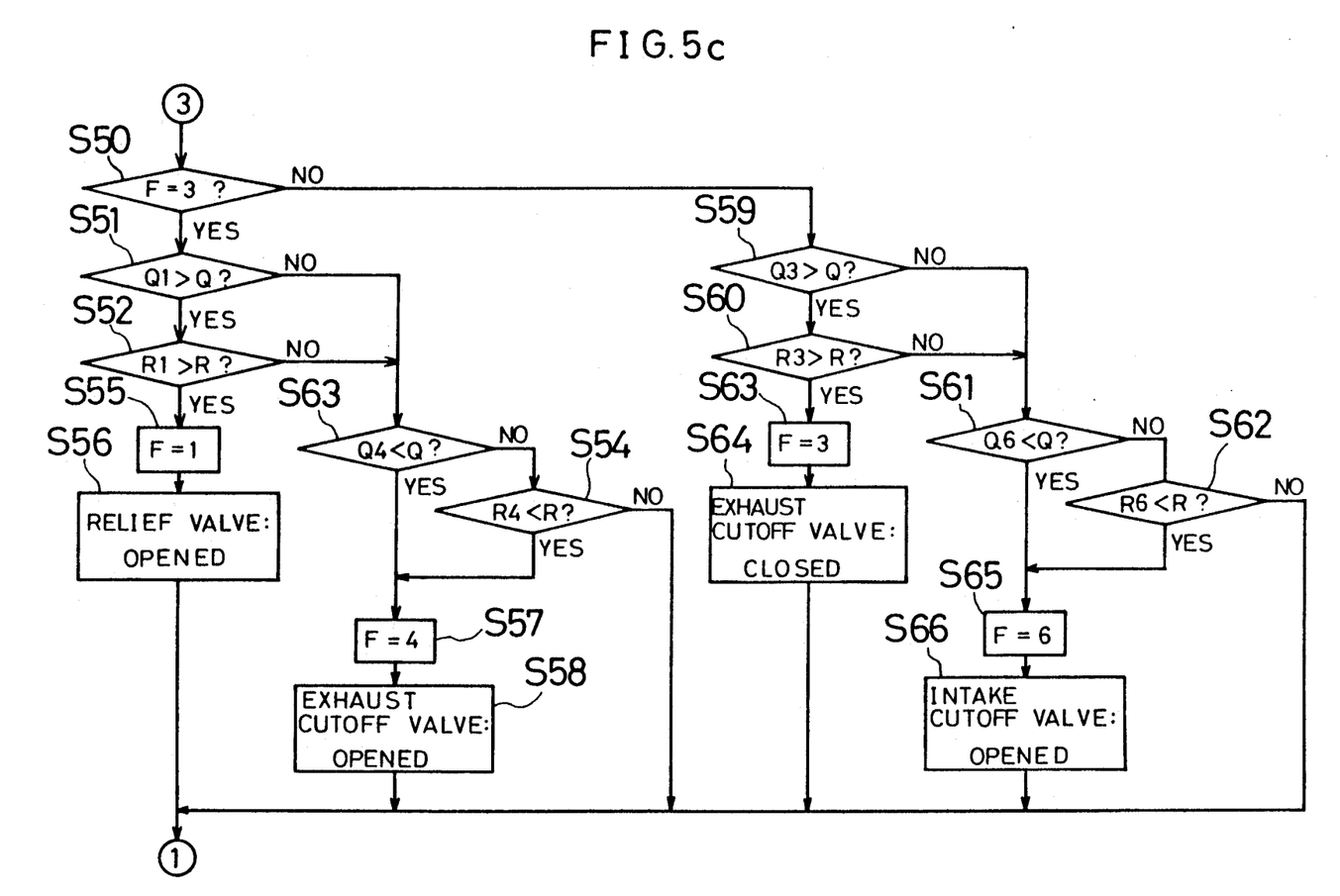

In the routine of the sequential turbo control in FIGS. 5a-5c, a system is initialized at step S11. That time, the later described flag F is set to be "1", and flag Fa is set to be "0". At step S12, the intake pressure PM and the engine speed R are read, and an intake equivalent value Q is calculated from the intake pressure PM and the engine speed R. At step S13, the first to the sixth set values Q1-Q6 of the intake equivalent value and the first to the sixth set values R1-R6 of the engine speed are read from the memory.

At the next step S14, a change ratio dPM/dt is checked whether or not it is more than the determined value A and the engine is judged whether or not it is in an acceleration region. If the judgement is YES, at step S15, the flag F is checked whether or not it is "0" in order to find whether or not it is acceleration starting time. If its an acceleration starting time, at step S16, a determined period of time $T_0$ is set in the delay timer T and at step S17, the flag Fa is turned to be "1" and the process moves to step S18. When the judgement is NO either at step S14 or S15, the process moves to step S18 immediately. At step S18, it is judged whether or not the determined period of time $T_0$ has passed from the acceleration starting time by checking whether or not the delay time is "0". If it is within the determined period of time $T_0$ from the acceleration starting time (the judgement at step S18 is NO, i.e., T≠0), at step S19, the delay timer T is decremented. At following step S20, the prior control status of the sequential turbo is maintained, then the process returns to the step S12 and the same process is repeated. Thus, for the period of time $T_0$ after the acceleration starting time, the exhaust gas flow is constantly maintained at a certain level by stopping the switching of the exhaust cutoff valve, the switching of which is controlled after the step S22 and the process of regulating control timing means are accomplished.

If the judgement at step S18 is YES, i.e., the period of time $T_0$ has passed from the acceleration starting time, the flag Fa is turned to be "0" at the step S21 and a judgement of the flag F and the control depending on the judgement is carried out after step S22.

As shown in FIG. 3, the flag F shows the driving status changed by the intake equivalent value Q and the engine speed R and takes one value from "1" to "6". When the driving status changes and crosses the each characteristic line Q1-R1~Q6-R6 in FIG. 3, the value of the flag F is changed. In detail, the value of flag F is changed to an even number such as 2, 4, 6 when the driving status moves to higher engine speed and higher engine load crossing over one of lines of Q2-R2, Q4-R4, Q6-R6 respectively. On the contrary, when the driving status moves to lower engine speed and lower engine load crossing one of lines Q5-R5, Q3-R3, and Q1-R1, the value of the flag F is changed to a odd number such as 5, 3, 1 respectively.

At step S22, the flag F is checked whether or not it is "1". If this judgement is YES, the prior driving status is in the low engine speed and in the low engine load region wherein the relief valve 28 is opened and both the exhaust cutoff valve 15 and the intake cutoff valve 25 are closed. At step S23, the intake equivalent value Q is judged whether or not it is more than the second set value 2, and at step S24, the engine speed R is judged whether or not it is more than the second set value R2. If both the judgements are NO, the process returns to step S12. If either one of the judgement is YES, the flag F is changed to be 2, i.e., F=2, at step S25, and the relief valve 28 is opened at step S26 and the process returns to step S12.

When the judgement of step S22 is NO, the flag F is checked whether or not F=2 m (m:integer), i.e., whether the flag F is either one of "2", "4", and "6" at step S27 as shown in FIG. 5b. If this judgement is YES, the flag F is checked whether or not it is "2" at step S28. If this judgement is YES, the driving status is crossing over the line Q2-R2 in FIG. 3, and the relief valve 28 is closed. The judgement whether or not the intake equivalent valve Q is more than the forth set valve Q4 is made at step S29, and the judgement whether or not the engine speed R is more than the forth set value R4 is made at step S30. When the above both judgements are NO and either one of the judgement whether or not the intake equivalent value Q is less than the first set value Q1 (step S31) and whether or not the engine speed R is less than the first set value R1 (step S32) is NO, the process returns to the step S12. When the judgement is YES either at step S29 or S30, the flag F is set to be 4, F=4, at step S33, and the exhaust cutoff valve is opened at step S34, then the process returns to the step S12. When the both judgements at step S31 and S32 are YES, the flag F is set to be 1, F=1, at step S35, and the relief valve 28 is opened at step S36, then the process returns to step S12.

When the judgement at step S28 is NO, the flag F is checked whether or not it is "4". If the judgement is YES, the driving status is crossing over the line Q4-R4 in FIG. 3 and the exhaust cutoff valve 15 is opened. The judgements whether or not the intake equivalent value Q is more than the sixth set value Q6 (step S38) and whether or not the engine speed R is more then the sixth set value R6 (step S39) are made. If both the above judgements are NO and either one of the judgements whether or not the intake equivalent value Q is less than the third set value Q3 (step S40) and whether or not the engine speed R is less than the third set value R3 (step S41) is NO, the process returns to step S12. If the judgement either at step S38 or S39 is YES, the flag F is set to be 6, F=6, at step S42, and the intake cutoff valve 25 is opened at step S43, then the process returns to step S12. If both judgements at steps S40 and S41 are YES, the flag F is set to be 3, F=3, at step S44 and the exhaust cutoff valve 15 is opened at step S45, then the process returns to step S12.

When the judgement at step S37 is NO, the flag F is "6" wherein the driving status is crossing the line Q6-R6 and the intake cutoff valve 25 is opened. The judgements whether or not the intake equivalent value Q is less than the fifth set value Q5 (step S46) and whether or not the engine speed R is less then the sixth set value R6 (step S47) are made. If either one of the judgements is NO, the process returns to the step S12. If both judgements are YES, the flag F is set to be "5", F=5, at step S48 and the intake cutoff valve 25 is closed at step S49, then the process returns to step S12.

When the judgement at step S27 is NO, the process moves to step S50 as shown in a flow chart in FIG. 5c and the flag F is checked whether or not it is "3". If the judgement is YES, the driving status is crossing over the line Q3-R3 in FIG. 3 and the exhaust cutoff valve 15 is closed. The judgements whether or not the intake equivalent valve Q is less than the first set value Q1 (step S51) and whether or not the engine speed R is less than the first set value R1 (step S52) are made. If either one of the above judgements is NO and both the judgements whether or not the intake equivalent value Q is more than the forth set value Q4 (step S53) and whether or not the engine speed R is more than the forth set value R4 (step S54) are NO, the process returns to step S12. If the judgement either at step S51 or S52 is YES, the flag F is set to be 1, F=1 at step S55, and the relief valve 28 is opened at step S56, then the process returns to step S12. If the judgement either at steps S53 and S54 is YES, the flag F is set to be 4, F=4 at step S57 and the exhaust cutoff valve 15 is opened at step S58, then the process returns to step S12.

When the judgement at step S50 is NO, the flag F is 5 wherein the driving status is under the line Q5-R5 in FIG. 3 and the intake cutoff valve 25 is closed. The judgements whether or not the intake equivalent value Q is less than the third set value Q3 (step S59) and whether or not the engine speed R is less than the third set value R3 (step S60) are made. If either one of the above judgements is NO and both judgements whether or not the intake equivalent value Q is more than the sixth set value Q6 (step S61) and whether or not the engine speed R is more than the sixth set value R6 (step S62) are NO, the process returns to step S12. If the judgements both at step S59 and S60 are YES, the flag F is set to be 3, F=3, at step S63, and the exhaust cutoff valve 15 is closed at step S64, then the process returns to step S12. IF either judgement at step S61 or S62 is YES, the flag F is set to be 6, F=6, at step S65 and the intake cutoff valve 25 is opened at step S66, then the process returns to step S12.

In this above constructed embodiment, the basic fuel injection quantity is determined by the engine speed R and the intake pressure PM detected by the intake pressure sensor 9 in order to control the fuel injection quantity so that the fuel injection quantity is increased at acceleration of the engine. Also, the exhaust cutoff valve 15 is opened/closed from the map in FIG. 3 according to the driving status in order to control the sequential turbo.

Figure 6:
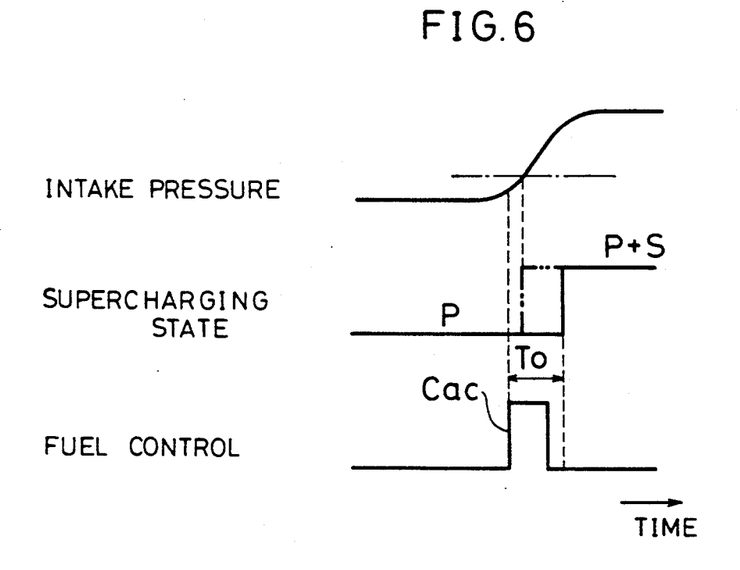
FIG. 6 is a time chart illustrating a relationship between time elapsed and an intake pressure, a supercharging condition, and a fuel control.

As shown in FIG. 6, a case that the driving status is crossing an equivalent line (alternate long and short dashed line in FIG. 6), for example, for the line Q4-R4 in FIG. 3 by the change of the intake pressure PM according to the acceleration is described below. According to the basic control, the exhaust cutoff valve 15 is changed to closed from opened state during the fuel is correctively increased at acceleration and supercharging is changed form "P" state wherein only the first supercharger is driven to "P+S" state wherein both the first and the second supercharger are driven (alternate and two short dashes line in FIG. 6).

However, in this embodiment, the change of supercharging from "P" state to "P+S" state (changing the exhaust gas flow) is delayed for the period of time $T_0$ that the fuel is correctively increased by the parameter $C_{ac}$ at acceleration. Therefore, during the fuel is correctively increased at acceleration, the exhaust pressure is prevented from being changed according to the change of supercharging and the fluctuation of air fuel ratio affected by the exhaust gas change is also prevented from getting large.

In the above embodiment, the changing means for changing the exhaust gas flow according to the driving status is a sequential turbo system wherein only the first turbosupercharger is driven in low intake air flow range and both the first and the second superchargers are driven at high intake air flow range. However, the changing means for changing the exhaust gas flow is not limited to the above embodiment. For example, a turbosupercharger of small capacity may be driven in low intake air flow region and a turbosupercharge of large capacity may be driven in high intake air flow region, or the exhaust passageways for supplying the exhaust gas to one turbosupercharger may be changed. In other words, any system which changes the exhaust gas flow according to the driving status to change the exhaust pressure can be used.

Figure 7:
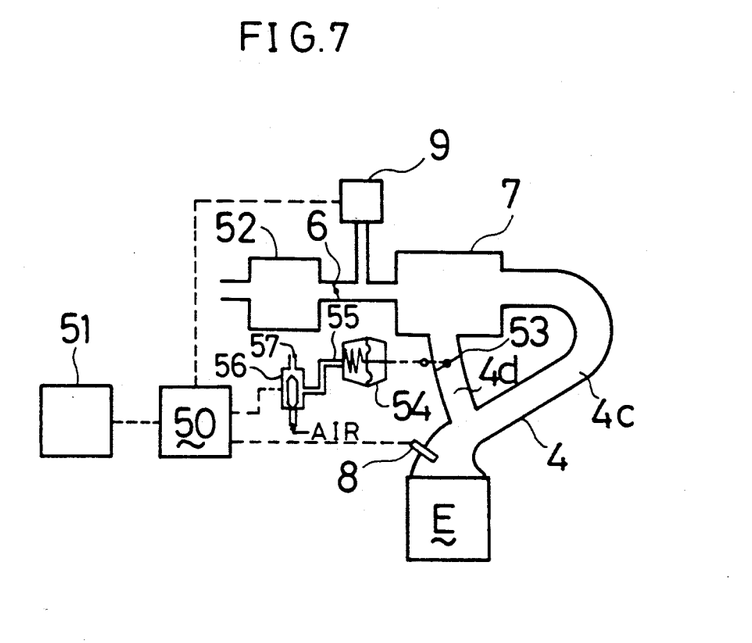
FIG. 7 is a schematic illustration showing an engine intake system of the present invention for another embodiment.

FIG. 7 illustrates another embodiment which is applied to a system for changing an intake air flow of an intake system.

In this embodiment, on the downstream side of the surge tank 7, an intake passage 4 is divided into a first passage 4c and a second passage 4d which are arranged in parallel. The length of the first passage 4c is set longer than the second passage 4d. A selector valve 53, which is driven by an actuator 54 composed of a diaphragm system, is provided on the second passage 4d.

An actuator 54 is connected to a three-way electro-magnet valve 56 through a control pressure flow passage 55. This three-way electro-magnet valve 56 selectively connects the control pressure flow passage 55 to an air side or a negative pressure passage 57 led to a negative pressure tank (refer to FIG. 2). In short, a selector valve 53 is opened or closed depending on the three-way electro-magnet valve 56.

Figure 8:
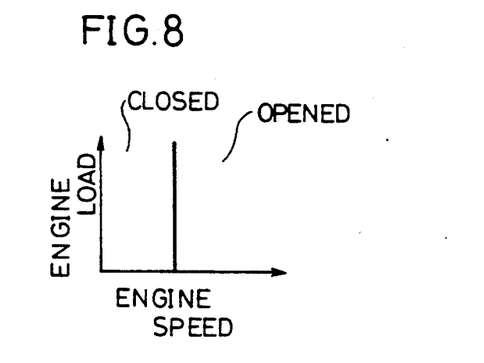
FIG. 8 is a characteristic chart for explaining opening/closing of a selector valve.

As shown in FIG. 8, the control unit 50 controls the opening/closing of the selector valve 53 according to the engine speed. The second passage 4d is opened or closed by the selector valve 53 and the intake air is supplied by the dynamic effect both in high and low engine speed region. In detail, in low engine speed region, the selector valve 53 is closed and accordingly, an intake negative wave, which is generated at the intake port by the opening of the intake valve at a initial stage of the intake air process of the engine cylinder, is transmitted to the upstream side of the first passage 4c. This negative pressure wave is converted into a positive pressure wave at the surge tank 7. This positive wave is transmitted to the downstream side through the first passage 4c and reaches the intake port at the last stage of the intake air process right before the intake valve is closed. By this positive pressure wave, the intake air is compressed to a combustion chamber and consequently, the charging effect is improved.

On the contrary, in higher engine speed region, the second passage 4d is opened by the selector valve 53. At this time, since the engine speed is high, the negative pressure wave of the intake air takes the shorter second passage 4d, not the longer first passage 4c, and reaches the surge tank 7 where it is converted to the positive pressure wave. This positive pressure wave returns to the intake port through the second passage 4d. By this structure, the intake air can be supplied to the engine not only in low engine speed region, but also in high engine speed region.

In this embodiment, by the control in the control unit 50, the movement of the selector valve 53 from being opened to being closed is delayed for a determined period of time so that the valve is changed after the fuel injection quantity is correctively increased. Thus, in this embodiment, the selector valve 53 is controlled according to the engine speed, and the supercharging effect of the intake air is gained in wide range of the engine speed.

The intake air flow varies depending on the switching of the selector valve 53 and the air fuel ratio may fluctuate by the changing of the intake air charging to the engine according to the intake are pressure. Therefore, when switching of the selector valve 53 and increasing the fuel injection quantity at acceleration of the engine occur at the same time, the air fuel ratio fluctuates greatly. However, in this embodiment, since the switching of the selector valve 53 from being opened to being closed is delayed for the period of so time that the valve is changed after the fuel injection quantity is correctively increased at acceleration of the engine, the air fuel ratio doesn't fluctuate and the combustion can be maintained in a good condition at acceleration.

What is claimed is:

1. An engine control system for an engine having intake air pressure detecting means for detecting intake air pressure and fuel control means for controlling fuel injection quantity on the basis of an intake pressure detected by said intake air pressure detecting means, said engine control system comprising:
   fuel injection quantity increasing means for increasing fuel injection quantity, which is controlled by said fuel control means, at acceleration of said engine:
   intake air pressure varying means for varying the intake pressure between a first intake air pressure and a second intake air pressure at the same engine load condition:
   changing means for changing the intake air pressure between the first intake air pressure and the second intake air pressure according to a driving condition of said engine; and
   control timing regulating means for regulating a relationship between a timing for increasing the fuel injection quantity by said fuel injection quantity increasing means and a timing for changing the intake air pressure by said changing means so that the timing for increasing the fuel injection quantity and the timing for changing the intake air pressure occur at different times.

2. An engine control system as claimed in claim 1, wherein said changing means change an exhaust gas flow of an exhaust system according to said driving condition of said engine.

3. An engine control system as claimed in claim 2, wherein said control timing regulating means delays the timing of changing the exhaust gas flow of said exhaust system by said changing means for a determined period of time from an engine acceleration starting point.

4. An engine control system as claimed in claim 2, wherein said exhaust system of said engine is divided into two systems, each turbine of a first and a second turbosupercharger is provided on each exhaust system; and
   said changing means switch the exhaust gas flow either supplying the exhaust gas to said turbine of said first supercharger and shutting off the exhaust gas to said turbine of said second supercharger, or supplying the exhaust gas to both turbines of said first and said second superchargers.

5. An engine control system as claimed in claim 4, wherein said control timing regulating means delays switching timing from supplying the exhaust gas only to said turbine of said first supercharger to supplying the exhaust gas to both turbines of said first and second supercharger for a determined period of time from said acceleration starting point of said engine.

6. An engine control system as claimed in claim 1, wherein said changing means change an intake air flow of an intake system according to said driving condition of said engine.

7. An engine control system as claimed in claim 6, wherein a volume part is formed on an intake passage of said engine, and an intake passage on the downstream side of said volume part is divided into a plurality of passages arranged in parallel; and
   said changing means comprising at least one selector valve for opening or closing said divided passages according to said driving condition of said engine to change a length of a passage from an engine cylinder to said volume part.

8. An engine control system as claimed in claim 7, wherein said control timing regulating means delays switching timing of said selector valve of said changing means for a determined period of time from an acceleration starting point of said engine.

* * * * *